United States Patent
Jeong

(10) Patent No.: US 9,546,470 B2
(45) Date of Patent: Jan. 17, 2017

(54) SCREEN DISPLAY METHOD OF WHEEL LOADER

(71) Applicant: Doosan Infracore Co., Ltd., Incheon (KR)

(72) Inventor: Hee Jun Jeong, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 14/655,248

(22) PCT Filed: Dec. 23, 2013

(86) PCT No.: PCT/KR2013/012000
§ 371 (c)(1),
(2) Date: Jun. 24, 2015

(87) PCT Pub. No.: WO2014/104678
PCT Pub. Date: Jul. 3, 2014

(65) Prior Publication Data
US 2015/0354178 A1    Dec. 10, 2015

(30) Foreign Application Priority Data
Dec. 24, 2012   (KR) .................. 10-2012-0152270

(51) Int. Cl.
*E02F 9/26*    (2006.01)
*B60K 35/00*   (2006.01)

(52) U.S. Cl.
CPC ............... *E02F 9/26* (2013.01); *B60K 35/00* (2013.01); *E02F 9/264* (2013.01); *E02F 9/267* (2013.01)

(58) Field of Classification Search
CPC .............. E02F 9/26; E02F 9/264; E02F 9/267; B60K 35/00
See application file for complete search history.

(56) References Cited

U.S. PATENT DOCUMENTS

2009/0009308 A1* 1/2009 Date .................... B60R 1/00
                                           340/439
2009/0224898 A1   9/2009 Graeve et al.
(Continued)

FOREIGN PATENT DOCUMENTS

| KR | 10-0673501 B1 | 1/2007 |
| KR | 10-1123738 B1 | 3/2012 |
| WO | 2011136185 A1 | 11/2011 |

OTHER PUBLICATIONS

International Search Report with English translation mailed Apr. 11, 2014 for corresponding International Application No. PCT/KR2013/012000, 5 pages.

*Primary Examiner* — Leon Flores
(74) *Attorney, Agent, or Firm* — John D. Veldhuis-Kroeze; Westman, Champlin & Koehler, P.A.

(57) ABSTRACT

Provided is a screen display method of a wheel loader, which is capable of improving efficiency of use of a monitor and user convenience, and displaying more vehicle information. A screen display method of a wheel loader according to an exemplary embodiment of the present disclosure includes: obtaining vehicle information about the wheel loader; displaying the obtained vehicle information on a plurality of monitors; and dividing and displaying the displayed vehicle information from at least one monitor to another monitor among the plurality of monitors according to an operation state of the wheel loader.

10 Claims, 22 Drawing Sheets

(56) References Cited

U.S. PATENT DOCUMENTS

2011/0301817 A1 12/2011 Hobenshield et al.
2014/0189585 A1* 7/2014 Brush .................. B60R 16/023
　　　　　　　　　　　　　　　　　　　　　715/808

* cited by examiner

SCREEN DISPLAY METHOD OF WHEEL LOADER

CROSS-REFERENCE TO RELATED APPLICATION

This Application is a Section 371 National Stage Application of International Application No. PCT/KR2013/012000, filed Dec. 23, 2013 and published, not in English, as WO 2014/104678 on Jul. 3, 2014.

FIELD OF THE DISCLOSURE

The present disclosure relates to a screen display method of a wheel loader, and more particularly, to technology for more efficiently displaying information about various vehicles on a monitor provided at a wheel loader when the wheel loader moves backward or performs excavation or loading.

BACKGROUND OF THE DISCLOSURE

Recently, customers of construction machinery heavy equipment, such as a wheel loader, demand mounting of a weighing system. The weighing system means a system for displaying information, such as weight applied to a bucket during an excavation or loading operation using the wheel loader, the total weight of work, and the amount of work for each customer/vehicle, so that a driver easily recognizes the information.

An existing front monitor and monitor for a side rearview camera mounted in construction machinery, such as a wheel loader, has a small size, so that the monitors are insufficient to display all of the information demanded by a user. Accordingly, a monitor used for only the weighing system has been mounted in most of the recently produced wheel loaders.

However, the monitor for the weighing system is not used for other functions, except for excavation and loading operations, so that the monitor does not exhibit any function in a normal driving state, and the monitor uses a separate controller, thereby increasing manufacturing costs. Further, vehicle information is displayed only through the front monitor and the monitor for the rearview camera, and front state information and the like, which a user additionally demands, is excluded from the vehicle information currently displayed to a driver due to a limitation in a size of the monitor.

Accordingly, development of a screen display method capable of improving user convenience and providing more information by more efficiently using a monitor provided at a wheel loader has been demanded.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter.

The present disclosure is conceived to solve the aforementioned problems, and an object of the present disclosure is to provide a screen display method of a wheel loader, which divides and displays vehicle information on a front monitor and two side monitors provided at a wheel loader, and displays a screen of a rearview camera and a screen of a weighing system on the two side monitors only when the wheel loader moves backward or performs an excavation/loading operation, thereby improving efficiency of use of the monitor and user convenience, and displaying more vehicle information.

In order to achieve the aforementioned object, an exemplary embodiment of the present disclosure provides a screen display method of a wheel loader, including: obtaining vehicle information about the wheel loader; displaying the obtained vehicle information on a plurality of monitors; and dividing and displaying the displayed vehicle information from at least one monitor to another monitor among the plurality of monitors according to an operation state of the wheel loader, in which operation state is a reverse operation state of equipment or a weighing measuring state of a load material.

The plurality of monitors may include a first side monitor and a second side monitors, and the dividing and displaying may include: (a) dividing and displaying various elements of vehicle information on the front monitor, and the first and second side monitors when the wheel loader is in a neutral state or is moving forward; (b) displaying a screen of the rear view camera on the first side monitor when the wheel loader moves backward, and dividing and displaying the information, which has been displayed on the first side monitor in operation (a), on the front monitor or the second side monitor; and (c) displaying a screen of a weighing system on the second side monitor when the wheel loader performs an excavation or loading operation, and dividing and displaying the information, which has been displayed on the second side monitor in operation (a), on the front monitor or the first side monitor.

Operation (b) may be initiated in response to a reverse signal, when the reverse signal is input, the screen of the rearview camera may be immediately displayed on the first side monitor, and a pop-up text notifying that the screen is changed may be displayed on the front monitor and the second side monitor for a predetermined time.

Operation (c) may be initiated in response to an angle sensor signal of a boom or the bucket, and when the angle sensor signal of the boom or the bucket is input, the screen of the weighing system may be immediately displayed on the second side monitor, and a pop-up text notifying that the screen is changed may be displayed on the front monitor and the first side monitor for a predetermined time.

The screen display method may further include (d) when a generation of an error is detected for internal configurations of the wheel loader, displaying a warning pop-up at least one of the front monitor and the first and second side monitors.

In operation (d), when the wheel loader is in the neutral state or is moving forward, a warning pop-up may be displayed on all of the front monitor, and the first and second side monitors, and a pop-up screen may be maintained until the warning pop-up is removed through a separate removal button.

In operation (d), when the wheel loader is performing the excavation or loading operation, a warning pop-up may be displayed on all of the front monitor and the first and second side monitors, in such a manner that a pop-up screen may automatically disappear on the second side monitor after a predetermined time, and the pop-up screen may be maintained on the front monitor and the second side monitor until a separate removal button is input.

In operation (a), information including at least one of a speed of an engine, an actual gear, a select gear, a drive/neutral/reverse state, an ECO gauge, and an accumulated movement distance may be displayed on the front monitor, and information including at least one of fuel gauge, a temperature of a coolant, a temperature of mission oil, a vehicle speed, a height and an angle of a bucket from the ground, and locations and shapes of the boom and the bucket may be displayed on the first side monitor or the second side monitor.

According to the present disclosure, vehicle information is divided and displayed on the front monitor and the two side monitors by different methods according to an operation state of the wheel loader, thereby improving efficiency of use of the monitor and more easily displaying significant vehicle information to a driver without omitting information.

Further, it is not necessary to increase a size of a front dash board according to an increase of the information quantity to be transferred to a driver through a screen division, thereby achieving an effect of cost reduction, and three monitors are controllable through one controller, thereby achieving an effect of reducing cost according to the addition of the controller.

Further, a monitor for a weighing system is additionally mounted, and the monitor is not used only for a corresponding usage, but information displayed on the front monitor and the screen of the rearview camera is divided and displayed on the monitor for the weighing system according to a vehicle state (travelling and operation), thereby improving information visibility of a driver.

Further, when each monitor has a defect, it is possible to display vehicle information through a normally operated monitor without omitting information.

DETAILED DESCRIPTION

The aforementioned objects, characteristics, and advantages will be described in detail below with reference to the accompanying drawings, and thus those skilled in the art to which the present disclosure pertains will easily implement the technical spirit of the present disclosure. In the following description, a detailed explanation of known related functions and constitutions may be omitted so as to avoid unnecessarily obscuring the subject manner of the present disclosure. Hereinafter, an exemplary embodiment according to the present disclosure will be described with reference to the accompanying drawings in detail.

Figure 1:
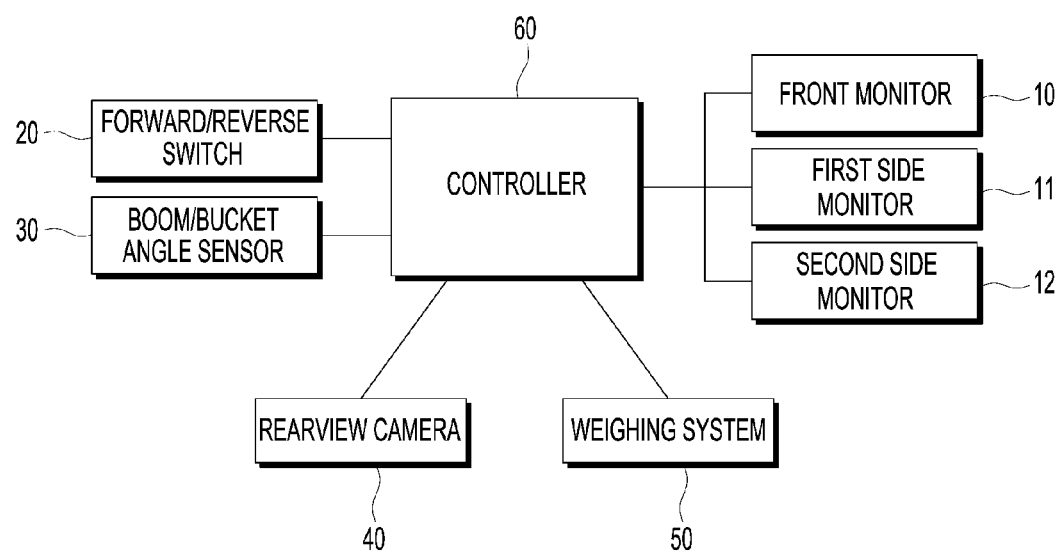
FIG. 1 is a configuration diagram of a screen display system of a wheel loader according to an exemplary embodiment of the present disclosure.

FIG. 1 is a configuration diagram of a screen display system of a wheel loader according to an exemplary embodiment of the present disclosure.

Referring to FIG. 1, a screen display system of a wheel loader according to an exemplary embodiment of the present disclosure includes a front monitor 10 positioned at a front part of a driver's seat of a wheel loader, first and second side monitors 11 and 12 positioned at side parts, a forward/reverse switch 20 generating a signal for moving the wheel loader forward and backward, a boom/bucket angle sensor 30 detecting a movement of a boom or a bucket, a rearview camera 40 photographing a rear portion of the wheel loader, a weighing system 50 measuring weight loaded on the bucket during an excavation or loading operation using the wheel loader, calculating the total weight of work, the amount of work for each customer/vehicle, and the like, and displaying the calculated total weight of work and amount of work, and a controller 60 controlling the configurations.

When a construction machine is in a neutral state or is moving forward, driving-related information is displayed on the front monitor 10, and information, such as a fuel quantity, a temperature, and a posture and a location of a front, is displayed on the first and second side monitors 11 and 12, other than the driving-related information. For example, information, such as a speed of an engine, an actual gear, a select gear, a drive/neutral/reverse state, an ECO gauge, and an accumulated movement distance, may be displayed on the front monitor 10 and information, such as fuel gauge, a temperature of a coolant, and a temperature of mission oil, may be displayed on the first side monitor 11, and information, such as a vehicle speed, a height and an angle of the bucket from the ground, and locations and shapes of the boom and the bucket, may be displayed on the second side monitor 12. Further, a warning light notifying operation situations of the internal configurations of the wheel loader, a generation of an error, and the like may be displayed at upper ends of the three monitors 10, 11, and 12, and various function icons may be displayed at lower ends of the three monitors 10, 11, and 12.

When the construction machine is being reversed, the rearview camera 40 is operated under a control of the controller 60, so that a screen of the first side monitor 11 is switched to a screen of the rearview camera 40. The screen switch may be performed by the controller 60 in response to an input of a reverse signal generated by the forward/reverse switch 20 by the shift of the reverse gear. In this case, the information, which has been displayed on the first side monitor 11 before the switch of the screen, may be divided and displayed on the front monitor 10 and the second side monitor 12.

When the construction machine is performing the excavation or loading operation, the weighing system 50 is operated under the control of the controller 60, so that a screen of the second side monitor 12 is switched to a screen of the weighing system 50. The screen switch is performed by the controller 60, and may be performed in response to an input of an angle sensor signal generated by detecting a movement of the boom or the bucket of the wheel loader by the boom/bucket angle sensor 30. In this case, information, which has been displayed on the second side monitor 12 before the switch of the screen, may be divided and displayed on the front monitor 10 and the first side monitor 11.

When the generation of the error for the internal configurations is detected during the operation of the wheel loader, the controller 60 displays a warning popup, a warning light, and the like on the three monitors 10, 11, and 12. In this case, the method of displaying a pop-up screen on each monitor may be changed according to an operation state of the wheel loader, and this will be described below.

Hereinafter, the screen display method of the wheel loader according to the present disclosure will be described in more detail based on the system illustrated in FIG. 1.

Figure 2:
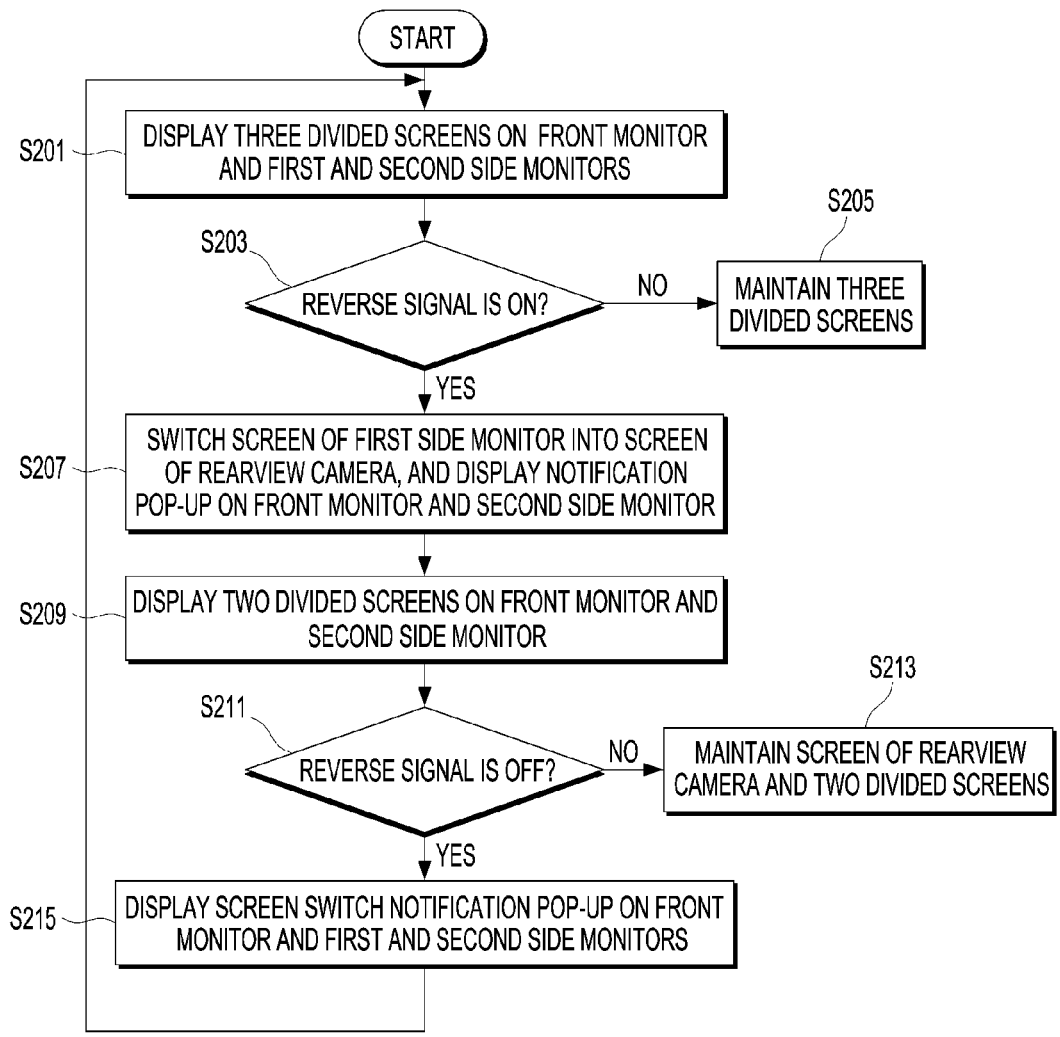
FIG. 2 is a diagram for describing a screen display method when a wheel loader performs a reverse operation.
Figure 3:
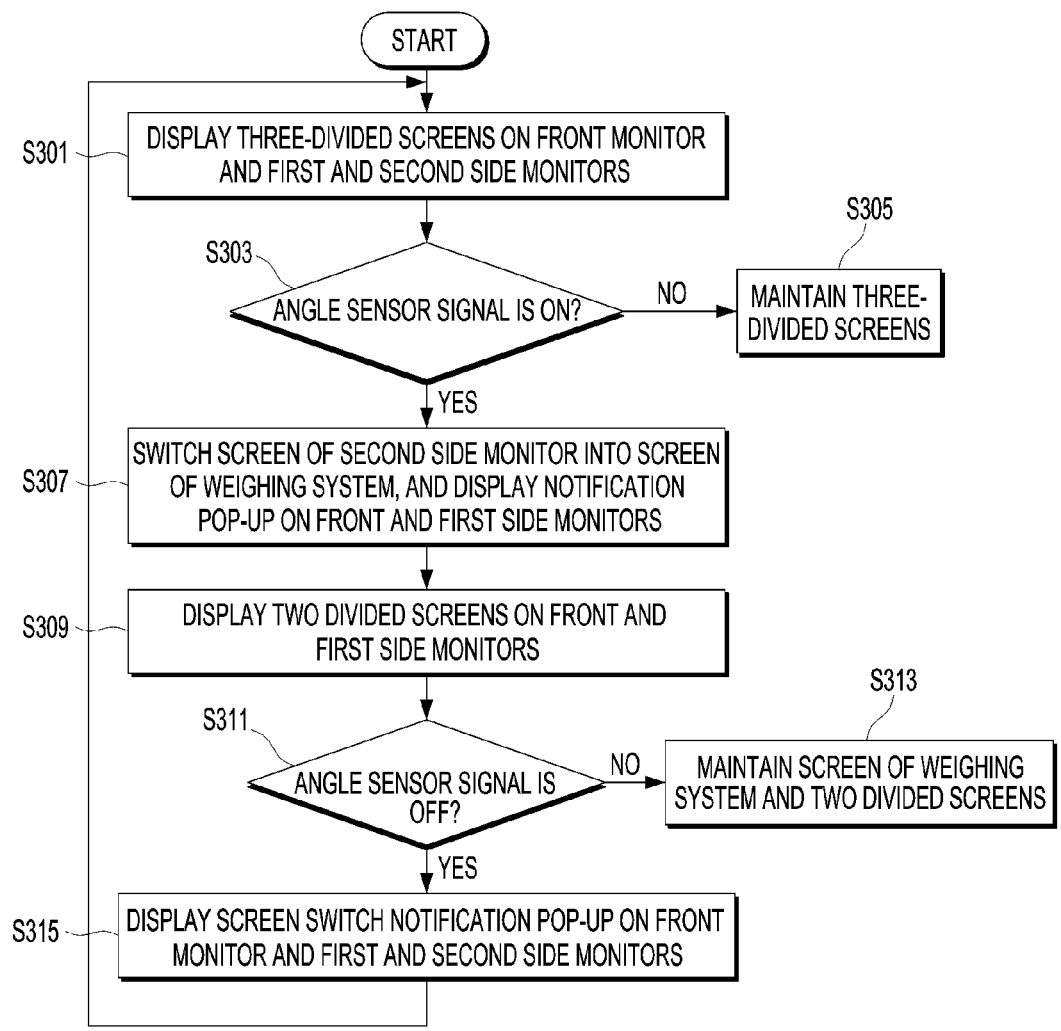
FIG. 3 is a diagram for describing the screen display method when a wheel loader performs an excavation or loading operation.

FIGS. 2 and 3 are flowcharts illustrating a screen display method of a wheel loader according to an exemplary embodiment of the present disclosure. Particularly, FIG. 2 is a diagram for describing a screen display method when a wheel loader performs a reverse operation.

Referring to FIG. 2, first, when a wheel loader starts (key on) and is in a neutral state or a forward operation state, the controller 60 divides various elements of vehicle information into three elements of vehicle information and displays the three-divided vehicle information on the front monitor 10 and the first and second side monitors 11 and 12 (S201). In this case, travelling-related information, such as a speed of an engine, a gear state, and an accumulated movement distance, is displayed on the front monitor 10, and information, such as a fuel quantity, a temperature, and a posture and a location of a front, may be displayed on the first and second side monitors 11 and 12, other than the travelling-related information.

Next, the controller 60 detects whether a reverse signal is generated by the forward/reverse switch 20 (S203), and when the reverse signal is not generated, the controller 60 maintains a three-divided screen state of the three monitors 10, 11, and 12 (S205). When the reverse signal is generated by a shift of the reverse gear by a driver, the controller 60 immediately switches the screen of the first side monitor 11 into the screen of the rearview camera, and displays a notification pop-up, such as "Screen is changed", on the front monitor 10 and the second side monitor 12 for a predetermined time (for example, three seconds) (S207).

Subsequently, the controller 60 divides information, which has been displayed on the first side monitor 11, and displays the divided information on the two divided screens of the front monitor 10 and the second side monitor 12 (S209). In this case, the information, which has been displayed on the three monitors 10, 11, and 12 in operation S201, may be divided into two elements of information and all displayed on the front monitor 10 and the second side monitor 12 without omitting information.

Next, the controller 60 detects an off of the reverse signal through the forward/reverse switch 20 (S211), and maintains the screen of the rearview camera of the first side monitor 11 and the two divided screen state of the front monitor and the second side monitor 12 while the reverse operation continues (S213).

Next, when the driver switches the gear state into the neutral state or the drive state again, so that the reverse signal is off, the controller 60 displays a notification pop-up, such as "Screen is changed", on the three monitors 10, 11, and 12 for a predetermined time (for example, three seconds) (S215), and returns to the three divided screen state (S201) of the front monitor and the first and second side monitors 10, 11, and 12.

FIG. 3 is a diagram for describing the screen display method when the wheel loader performs the excavation or loading operation.

Referring to FIG. 3, first, when the wheel loader starts (key on) and is in a neutral state or a forward operation state, the controller 60 divides various elements of vehicle information into three elements of vehicle information and displays the three-divided vehicle information on the front monitor 10 and the first and second side monitors 11 and 12 (301). In this case, travelling-related information, such as a speed of an engine, a gear state, and an accumulated movement distance, is displayed on the front monitor 10, and information, such as a fuel quantity, a temperature, and a posture and a location of a front, may be displayed on the first and second side monitors 11 and 12, other than the travelling-related information.

Next, the controller 60 detects whether an angle sensor signal of the boom or the bucket is generated by the boom/bucket angle sensor 30 (S303), and when the angle sensor signal is not generated, the controller 60 maintains a three-divided screen state of the three monitors 10, 11, and 12 (S305). Here, the angle sensor signal may be a signal generated when a movement of an operation lever of the wheel loader by a manipulation of a driver is detected. When the angle sensor signal is generated, the controller 60 immediately switches the screen of the second side monitor 12 into the screen of the weighing system, and displays a notification pop-up, such as "Screen is changed", on the front monitor 10 and the first side monitor 11 for a predetermined time (for example, three seconds) (S307).

Subsequently, the controller 60 divides information, which has been displayed on the second side monitor 12, and displays the divided information on the two divided screens of the front monitor 10 and the first side monitor 11 (S309). In this case, the information, which has been displayed on the three monitors 10, 11, and 12 in operation S301, may be divided into two elements of information and all displayed on the front monitor 10 and the first side monitor 11 without omitting information.

Next, the controller 60 detects an off of the angle sensor signal through the boom/bucket angle sensor 30 (S311), and maintains the screen of the weighing system of the second side monitor 12 and the two divided screen state of the front monitor and the first side monitor 11 while the excavation or loading operation continues (S313).

Next, when the excavation or loading operation is completed, a movement of the operation lever is not detected, and the angle sensor signal is off, the controller 60 displays a notification pop-up, such as "Screen is changed", on the three monitors 10, 11, and 12 for a predetermined time (for example, three seconds) (S315), and returns to the three divided screen state (S301) of the front monitor and the first and second side monitors 10, 11, and 12.

Figure 4:
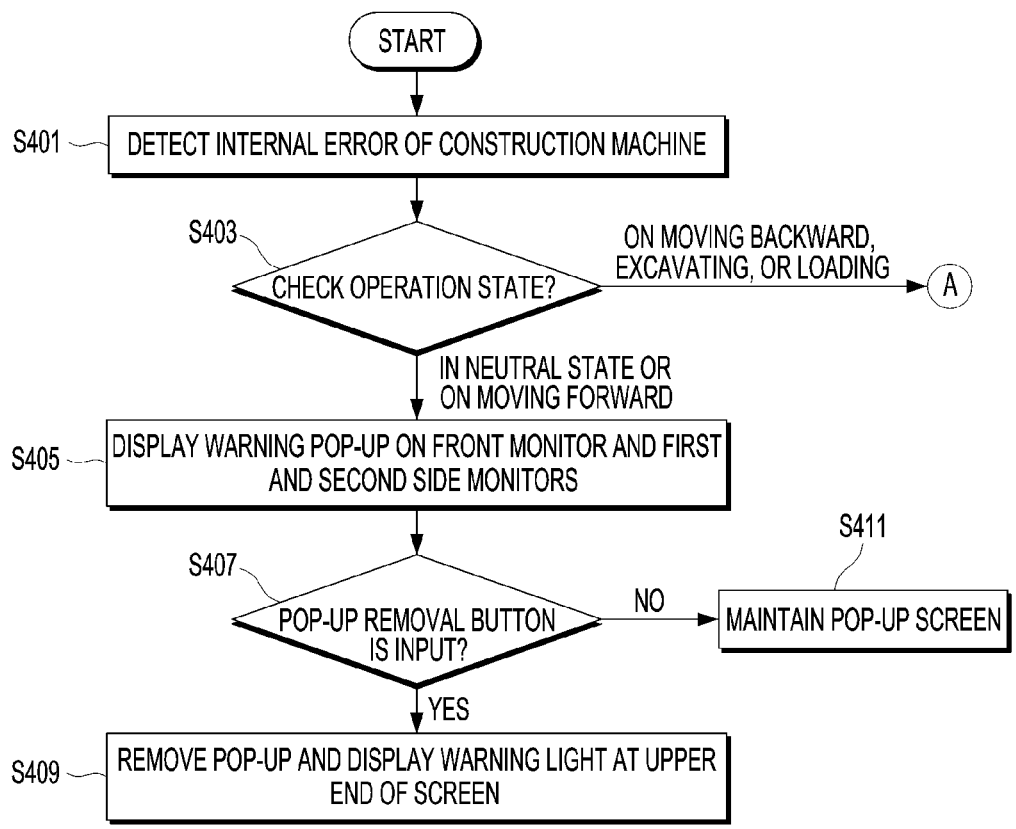
FIGS. 4 and 5 are diagrams for describing the screen display method when an error is generated in an internal configuration during an operation of the wheel loader.
Figure 5:
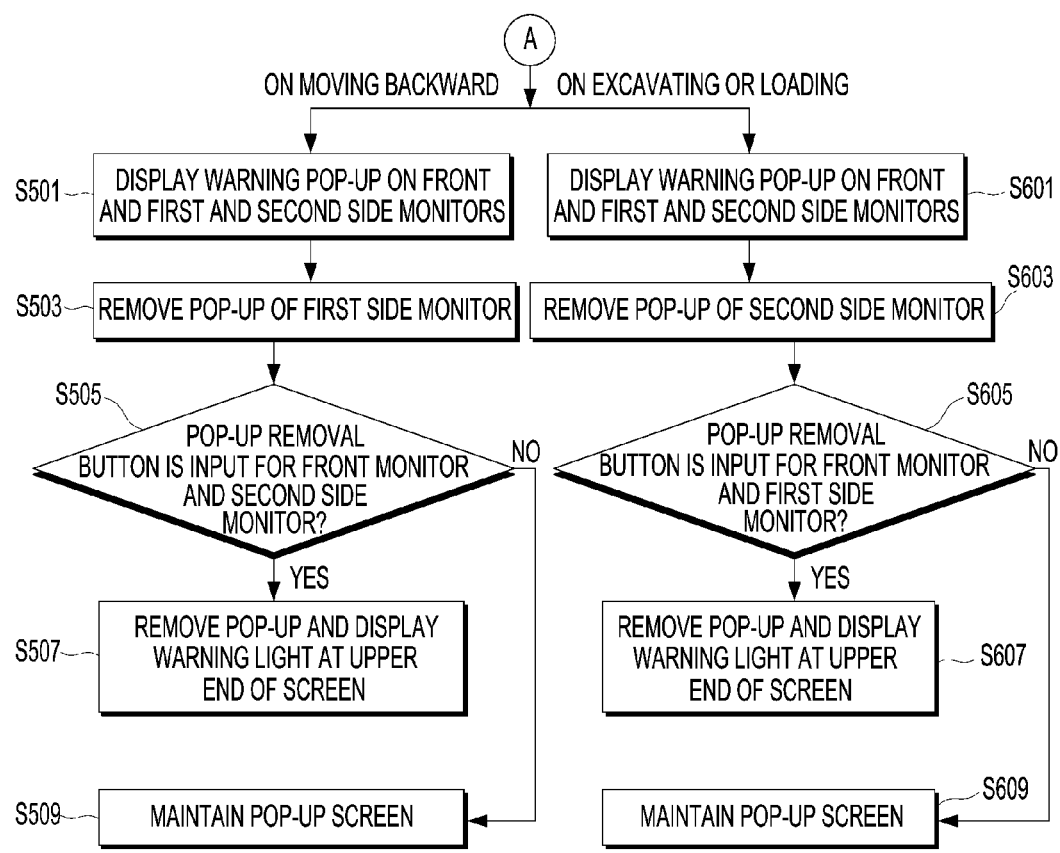

FIGS. 4 and 5 are diagrams for describing the screen display method when an error is generated in the internal configuration during an operation of the wheel loader.

Referring to FIGS. 4 and 5, first, the controller 60 detects whether an error is generated in the operation configurations of the wheel loader through an engine control unit and the like (S401).

When it is detected that an error is generated in a specific configuration, the controller 60 checks an operation state of the wheel loader (S403). The controller 60 checks whether the wheel loader is in the neutral state, is moving forward, is moving backward, or is performing the excavation or loading operation, and notifies a driver of the generation of the error by different methods according to each operation state. In the present exemplary embodiment, it is assumed that an error, in which a pressure of the engine is lower than a normal state, is generated.

When the wheel loader is in the neutral state or is moving forward, the controller 60 displays a warning pop-up, such as "Engine pressure is low", on all of the front monitor and the first and second side monitors 10, 11, and 12 (S405).

Next, the controller 60 checks whether the driver inputs a separate removal button for the warning pop-up (S407), and when the removal button is input, the controller 60 removes the pop-up and then displays a warning light at the upper end of the screen (S409). When the removal button of the pop-up is not input, the controller 60 continuously maintains the pop-up screen (S411).

When the wheel loader is moving backward (FIG. 5) as a result of the check of the operation state of the wheel loader in operation S403, the controller 60 displays the warning pop-up, such as "Engine pressure is low", on all of the three monitors 10, 11, and 12 (S501), and makes the warning pop-up on the first side monitor 11, on which the screen of the rearview camera has been displayed, automatically disappear after a predetermined time (for example, three seconds) (S503).

Next, for the front and second side monitors 10 and 12, the controller 60 determines whether the pop-up removal button is input by the driver (S505), and when the removal button is input, the controller 60 removes the pop-up and displays a warning light at upper ends of the screens (S507), and when the removal button is not input, the controller 60 continuously maintains the pop-up screen (S509).

When the wheel loader is performing the excavation or loading operation as a result of the check of the operation state of the wheel loader in operation S403, the controller 60 displays the warning pop-up, such as "Engine pressure is low", on all of the three monitors 10, 11, and 12 (S601), and makes the warning pop-up of the second side monitor 12, on which the screen of the weighing system has been displayed, automatically disappear after a predetermined time (for example, three seconds) (S603).

Next, for the front and first side monitors 10 and 11, the controller 60 determines whether the pop-up removal button is input by the driver (S605), and when the removal button is input, the controller 60 removes the pop-up and displays a warning light at upper ends of the screens (S607), and when the removal button is not input, the controller 60 continuously maintains the pop-up screen (S609).

FIGS. 6 to 8, 9 to 16, and 17 to 22 are diagrams illustrating examples of screens actually implemented on the front monitor and the first and second side monitors 10, 11, and 12, respectively.

Figure 6:
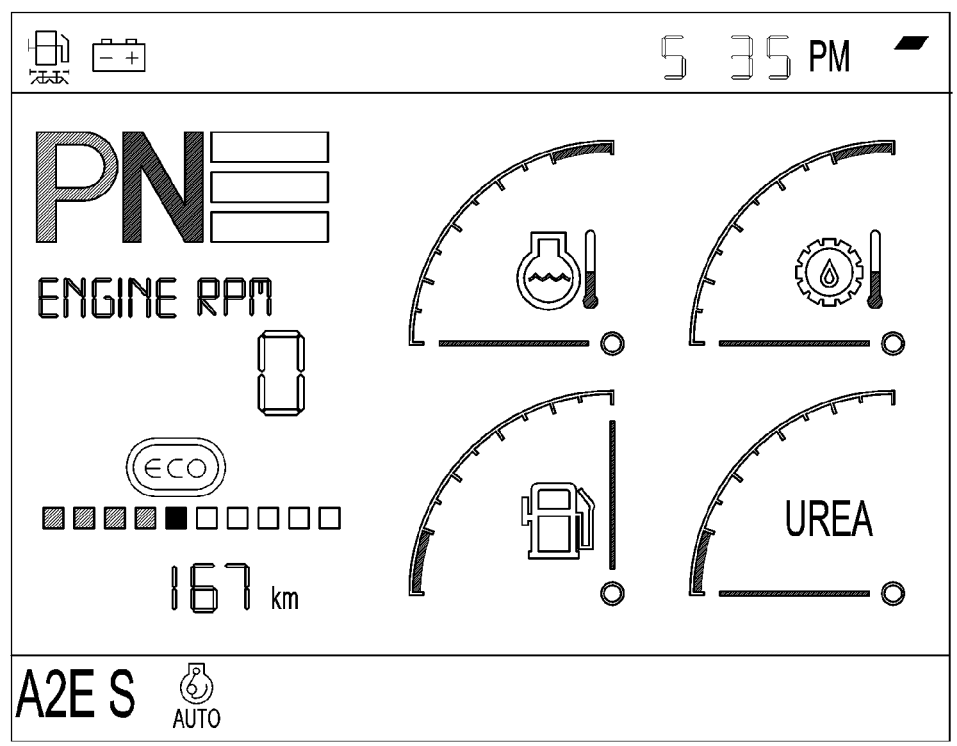
FIGS. 6 to 8, 9 to 16, and 17 to 22 are diagrams illustrating examples of screens actually implemented on a front monitor, and first and second side monitors in various operation situations of the wheel loader.
Figure 7:
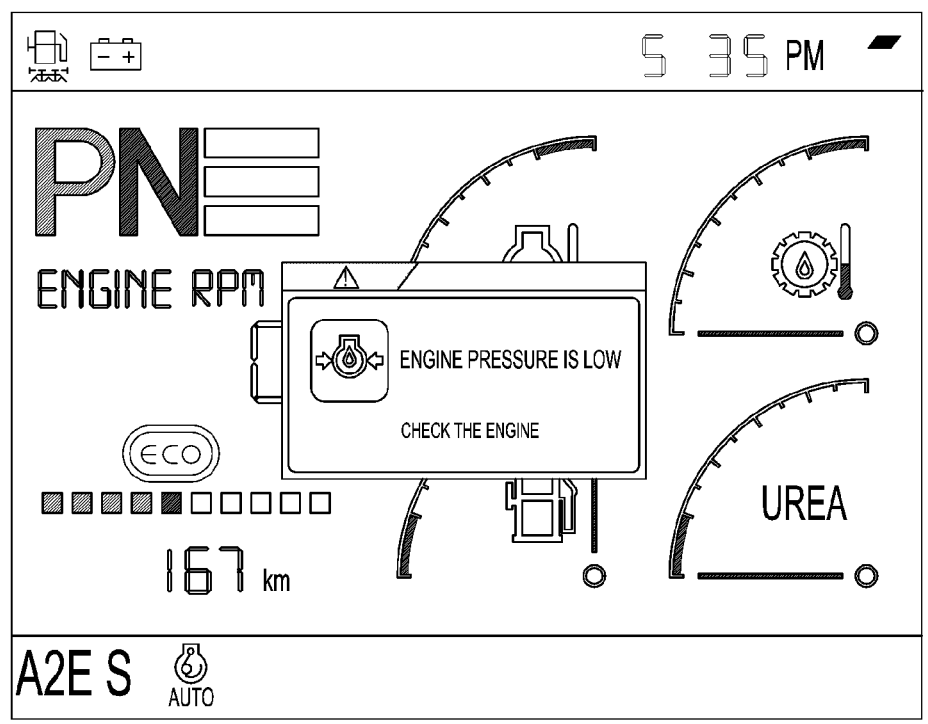
Figure 8:
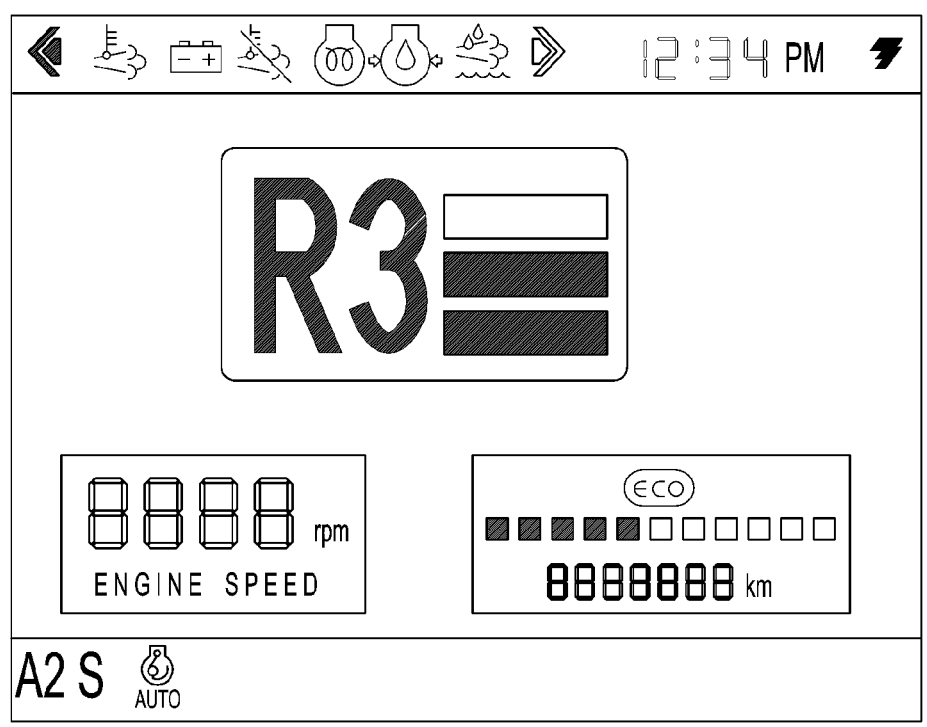

FIG. 6 is a diagram of the screen of the front monitor 10 when the wheel loader is in the neutral state or is moving forward. FIG. 7 illustrates a screen, on which a warning pop-up appears, when an error is generated in the engine. The warning pop-up may be displayed on the same form in all of the screens. FIG. 8 illustrates the screen of the front monitor 10 when the wheel loader is moving backward, or performing the excavation or loading operation. It can be seen that information displayed at a center of the screen in FIG. 6 is displayed in a symbol form at an upper end of the screen in FIG. 8. "R3" at a center upper part of the screen indicates an actual gear state, a right box of R3 indicates a select gear state, a left side of a center lower part of the screen indicates an engine speed, and a right side of the center lower part of the screen indicates accumulated distance information.

Figure 9:
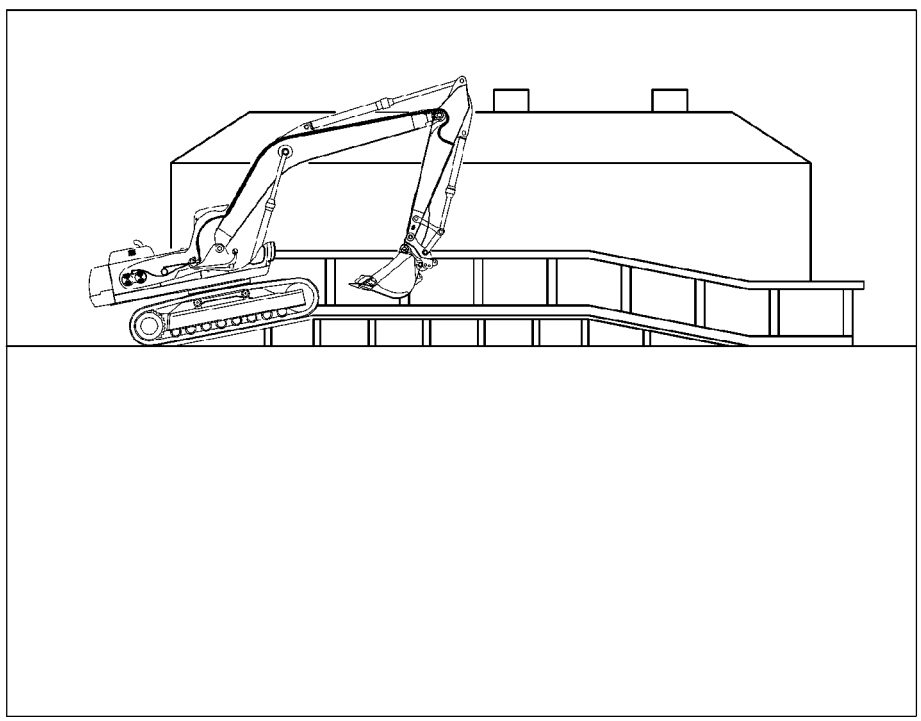
Figure 10:
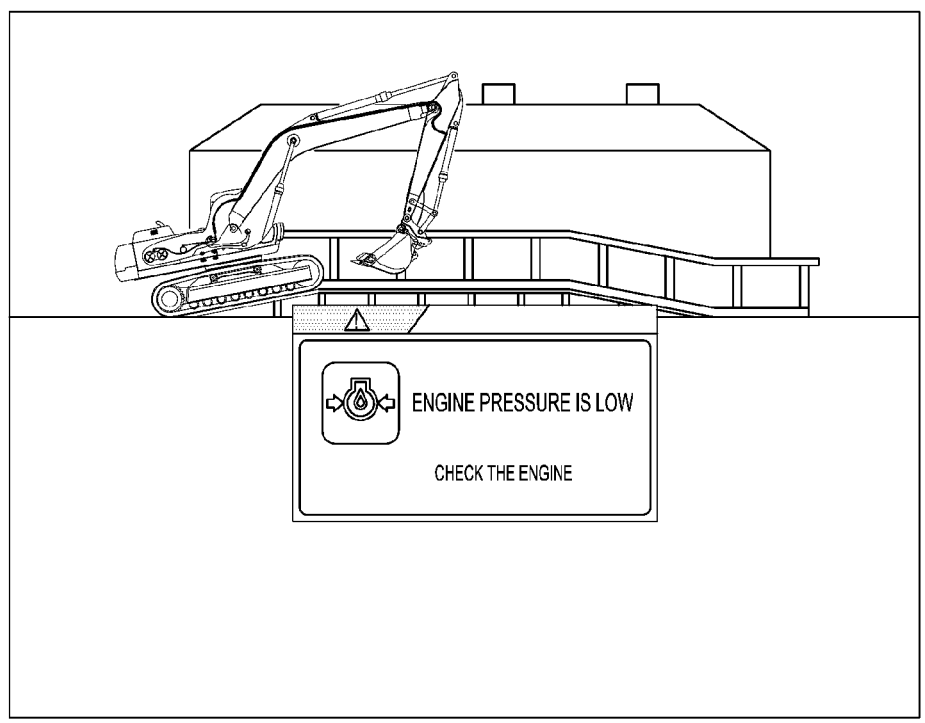
Figure 11:
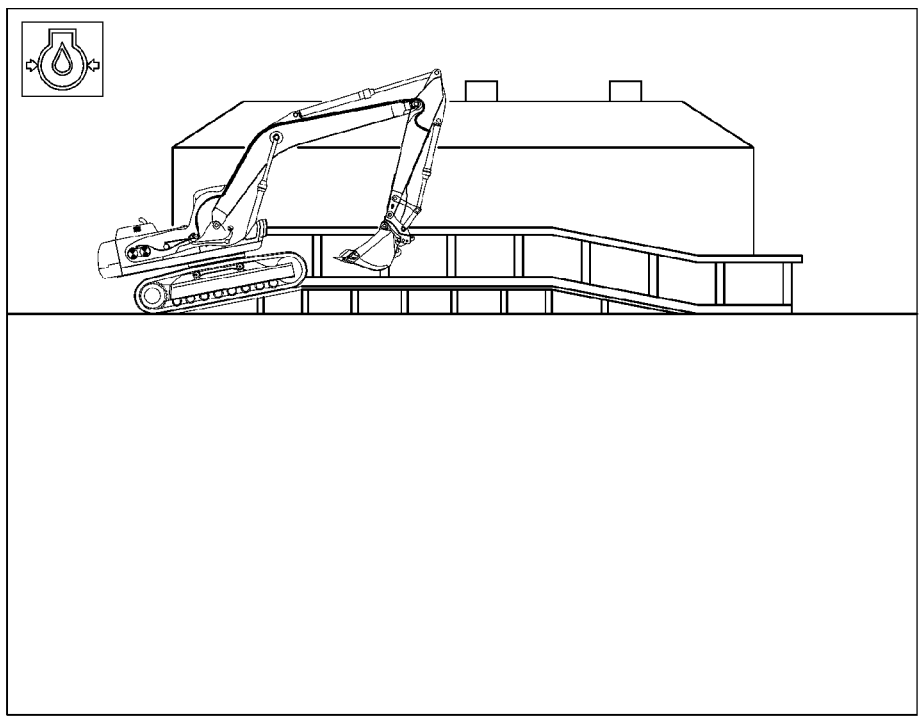
Figure 12:
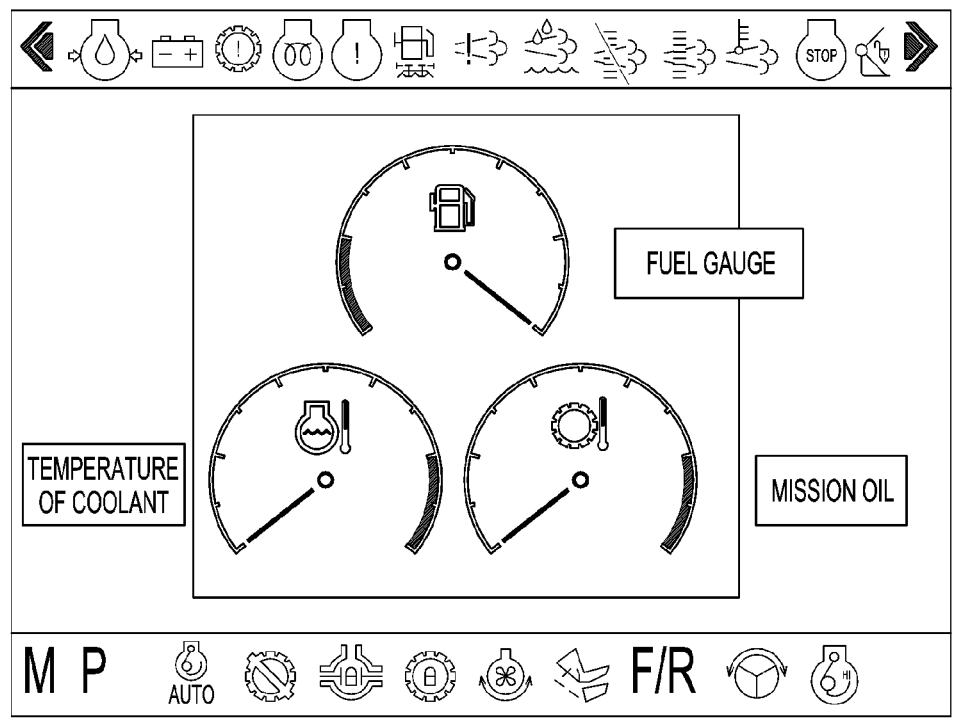
Figure 13:
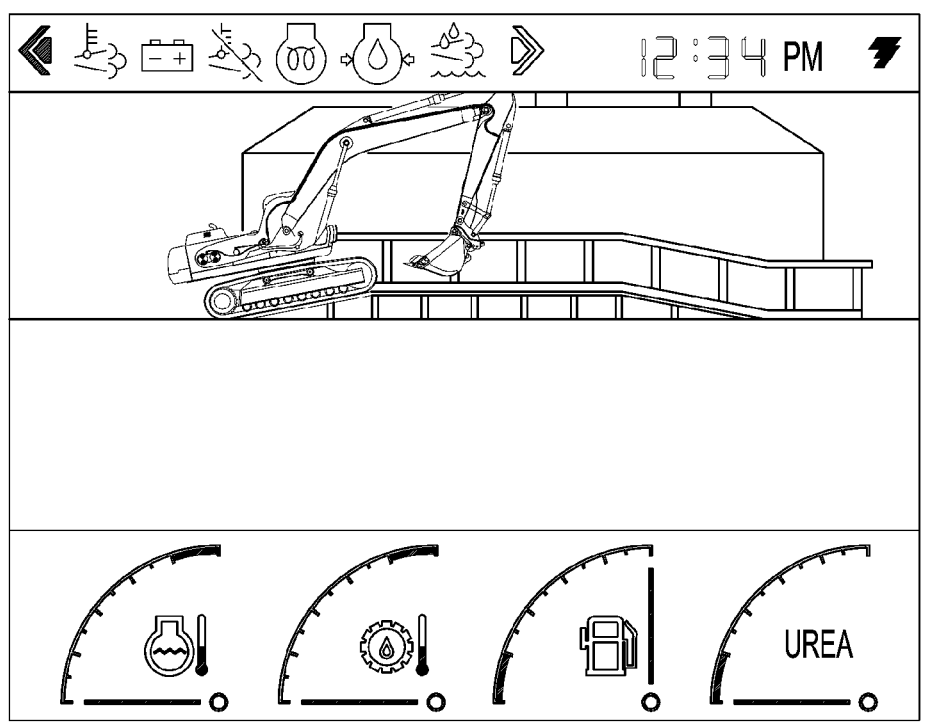
Figure 14:
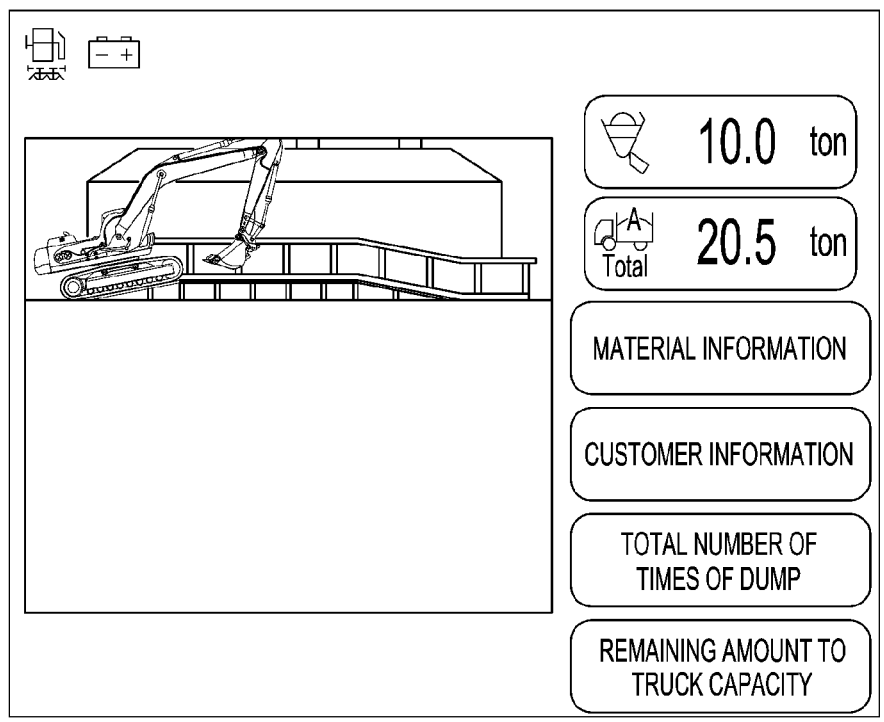
Figure 15:
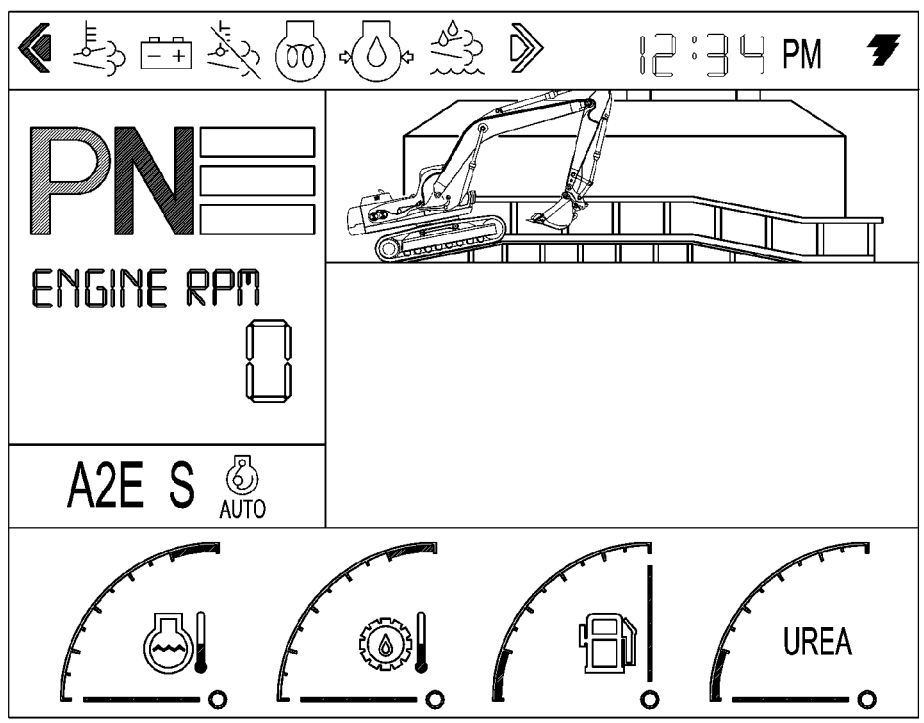
Figure 16:
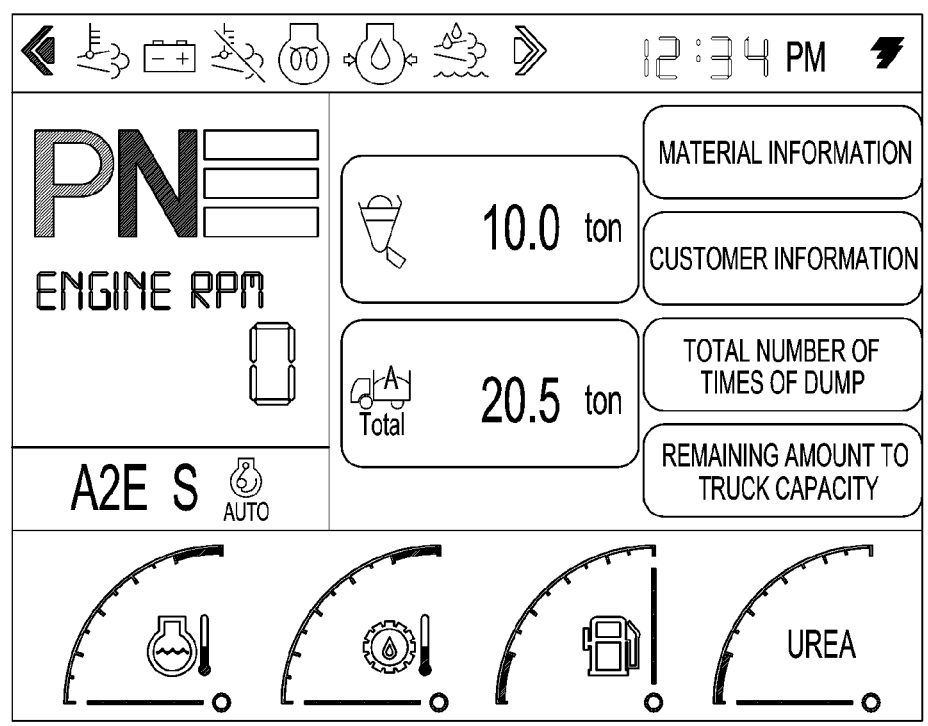

FIG. 9 illustrates the screen of the rearview camera displayed on the first side monitor 11 when the wheel loader is moving backward. FIG. 10 illustrates the screen of the rearview camera, on which an engine warning pop-up is displayed, and FIG. 11 illustrates the screen, on which the warning pop-up is removed and a warning indicate light symbol is displayed at an upper end of the screen. FIG. 12 illustrates the screen of the first side monitor 11 when the wheel loader is performing the excavation or loading operation. FIG. 13 illustrates the screen of the first side monitor 11 in a situation where the front monitor 10 has a defect, and it can be seen that various information, which has been displayed on the front monitor 10 together with the screen of the rearview camera, are divided and displayed at the upper and lower part of the screen of the first side monitor 11. FIG. 14 illustrates the screen of the first side monitor 11 in a situation where the second side monitor 12 has a defect, and FIGS. 15 and 16 illustrate the screen of the first side monitor 11 when all of the front monitor 10 and the second side monitor 12 have defects and the wheel loaders is moving backward and is performing the excavation or loading operation, respectively. It can be seen that the screen is divided into various forms, so that various vehicle-related information may be displayed without omitting information.

Figure 17:
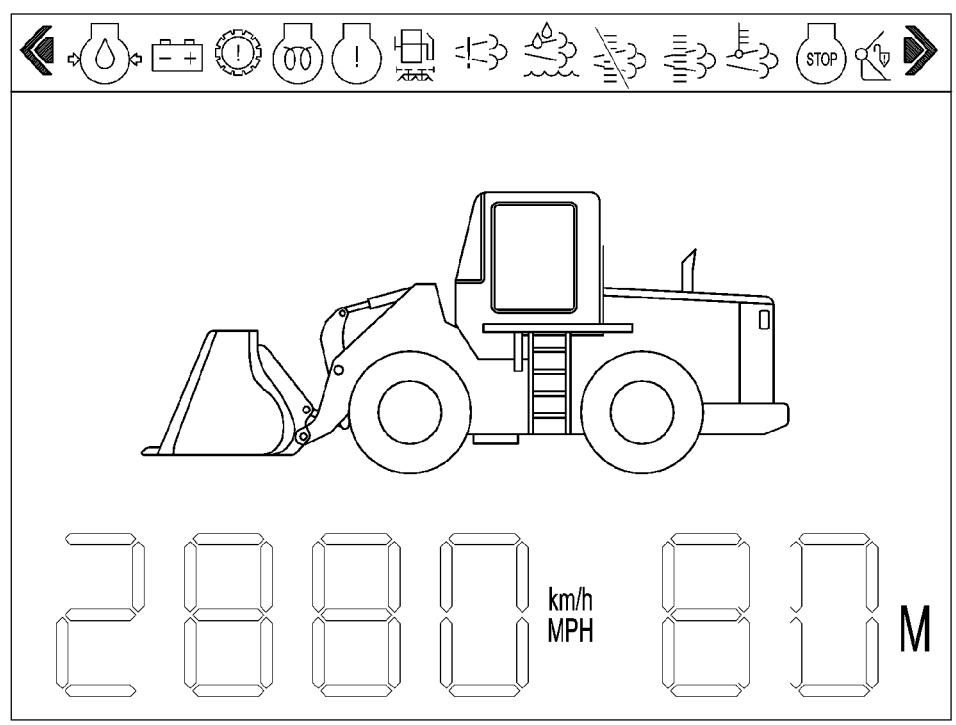
Figure 18:
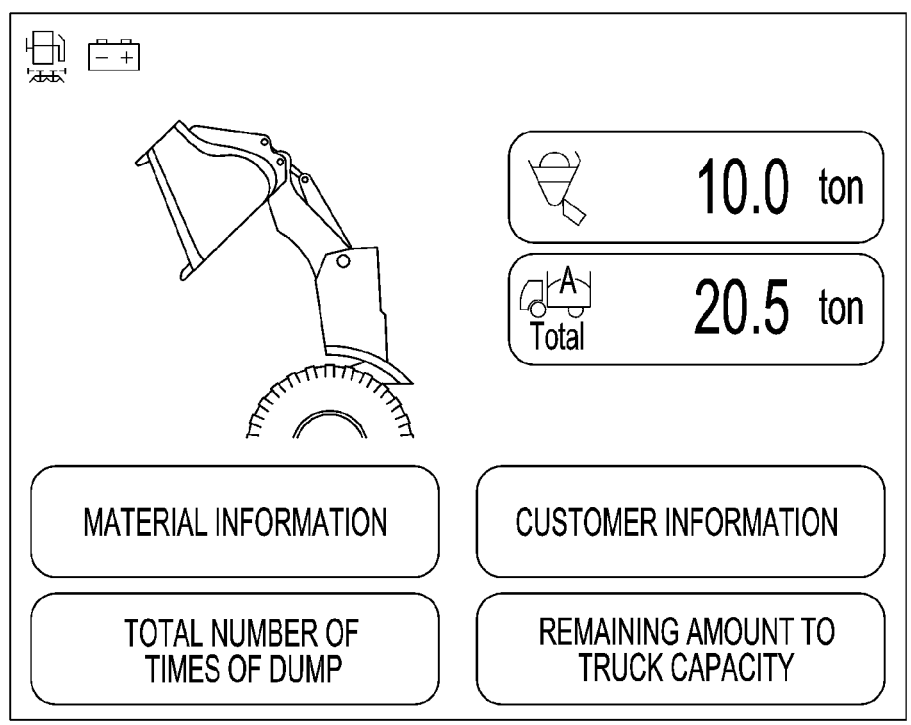
Figure 19:
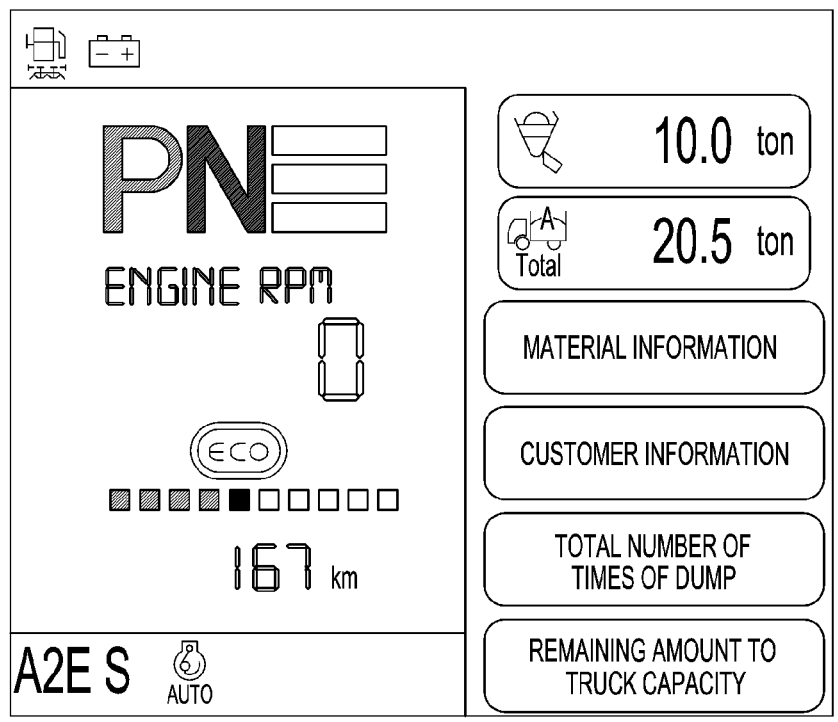
Figure 20:
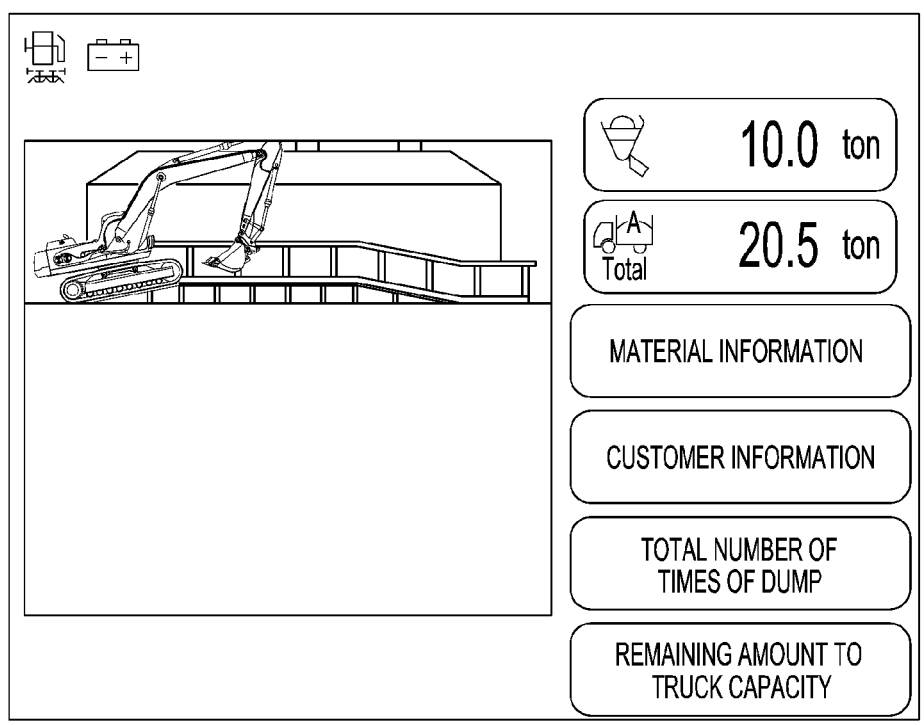
Figure 21:
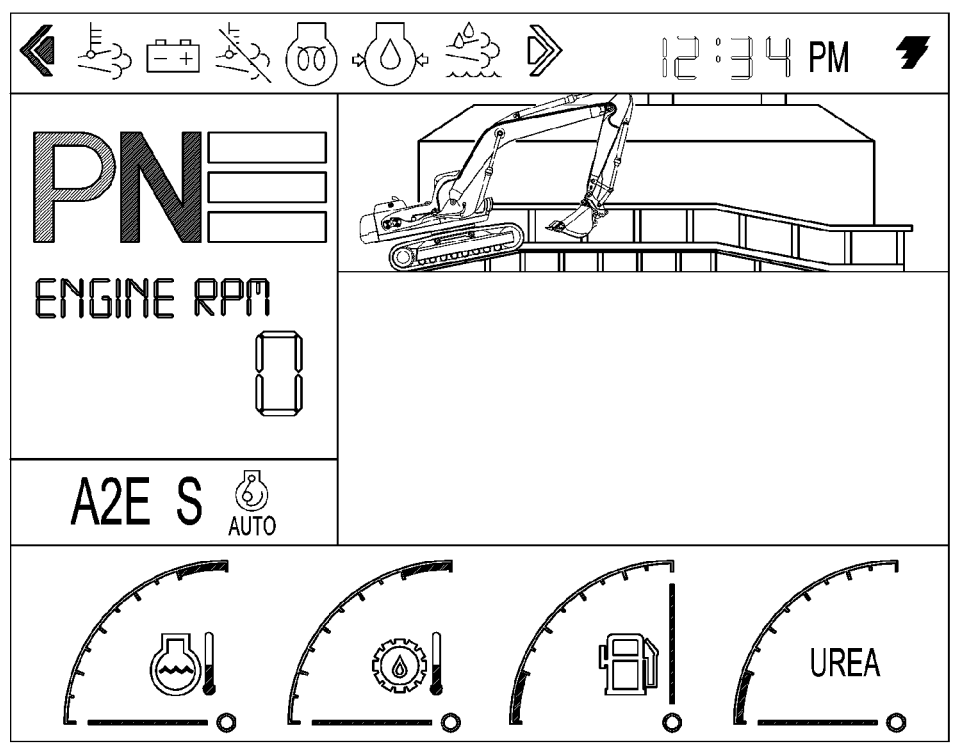
Figure 22:
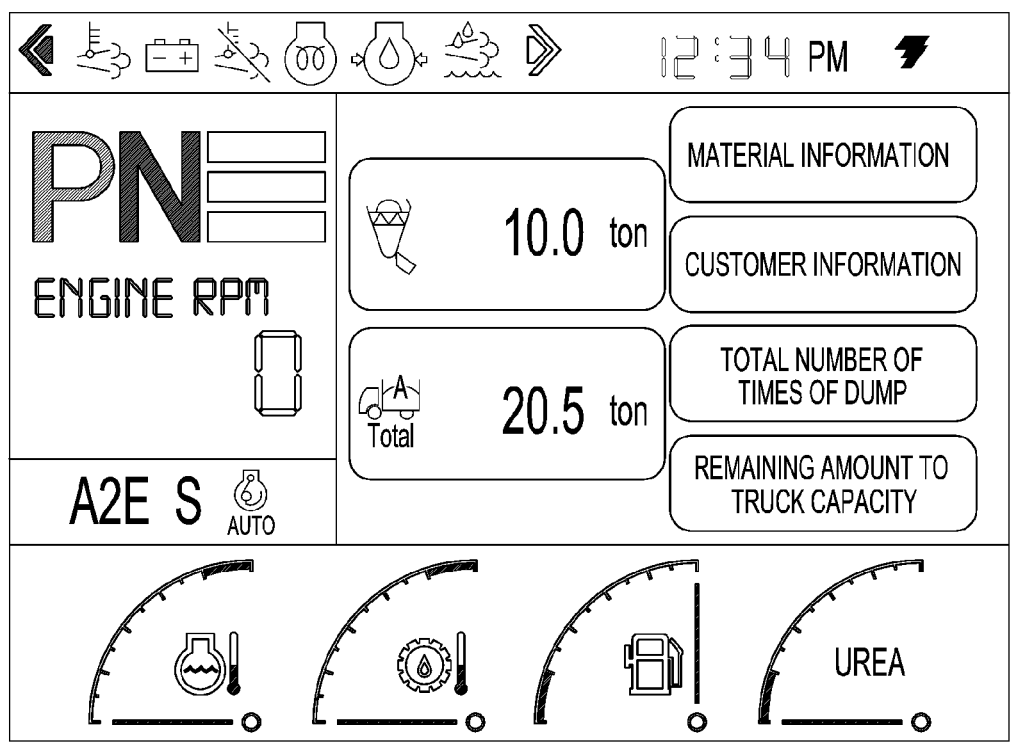

FIG. 17 illustrates the screen of the second side monitor 12 when the wheel loader is in the neutral state or is moving forward, and FIG. 18 illustrates the screen of the second side monitor 12 when the wheel loader performs the excavation operation. FIG. 19 illustrates the screen of the second side monitor 12 when the front monitor 10 has a defect and the wheel loader performs the excavation or loading operation. FIG. 20 illustrates the screen of the second side monitor 12 when the first side monitor 11 has a defect and the wheel loader moves backward. FIGS. 21 and 22 illustrate the screen of the second side monitor 12 when the wheel loader moves backward and the screen of the second side monitor 12 when the wheel loader performs the excavation or loading operation, respectively, when all of the front and first side monitors 10 and 11 have defects. Similarly, it can be seen that the screen is divided into various forms, so that various vehicle-related information may be displayed without omitting information.

From the foregoing, it will be appreciated that various embodiments of the present disclosure have been described herein for purposes of illustration, and that various modifications may be made without departing from the scope and spirit of the present disclosure. The exemplary embodiments disclosed in the specification of the present disclosure will not limit the present disclosure. The scope of the present disclosure shall be construed on the basis of the following claims, and it shall be construed that all of the technical ideas included within the scope equivalent to the claims belong to the present disclosure.

According to the screen display method of the wheel loader according to the present disclosure, vehicle information is divided and displayed on the front monitor and the two side monitors by different methods according to an operation state of the wheel loader, to improve efficiency of use of the monitor and more easily display significant vehicle information to a driver without omitting information, which exceeds a limit of the related art, so that a device, to which the screen display method of the wheel loader according to the present disclosure is applied, may sufficiently be marketed or available to sell, as well as the relevant technology is used, and the screen display method of the wheel loader according to the present disclosure may be realistically and clearly carried out, thereby being an industrially applicable invention.

The invention claimed is:
1. A screen display method of a wheel loader, comprising:
   obtaining vehicle information about the wheel loader;
   displaying the obtained vehicle information on a plurality of monitors; and
   dividing and displaying the displayed vehicle information from at least one monitor to another monitor among the plurality of monitors according to an operation state of the wheel loader, wherein modes of the operation state include a reverse operation state, a weighing measuring state of a load material, a neutral state, and a drive state, wherein the plurality of monitors includes a front monitor, a first side monitor, and a second side monitor, wherein the dividing and displaying includes operation (a) that includes dividing and displaying various elements of the vehicle information together on the front monitor and the first and second side monitors when the wheel loader is in the neutral state or is moving forward in the drive state, wherein in the operation (a), information including at least one of a speed of an engine, an actual gear, a select gear, the operation state, an ECO gauge, and an accumulated movement distance is displayed on the front monitor, and information including at least one of a fuel gauge, a temperature of a coolant, a temperature of mission oil, a vehicle speed, a height and an angle of a bucket from the ground, and locations and shapes of the boom and the bucket is displayed on the first side monitor or the second side monitor.

2. The screen display method of claim 1, wherein the dividing and displaying further includes operation (b) that includes displaying a screen of a rearview camera on the first side monitor when the wheel loader moves backward in the reverse state, and dividing and displaying the information, which has been displayed on the first side monitor in the operation (a), on the front monitor or the second side monitor.

3. The screen display method of claim 2, wherein the operation (b) is initiated in response to a reverse signal, when the reverse signal is input, the screen of the rearview camera is immediately displayed on the first side monitor, and a pop-up text notifying that the screen is changed is displayed on the front monitor and the second side monitor for a predetermined time.

4. The screen display method of claim 2, further comprising:
operation (d), that includes: when a generation of an error is detected for internal configurations of the wheel loader, displaying a warning pop-up on least one of the front monitor and the first and second side monitors.

5. The screen display method of claim 4, wherein in the operation (d), when the wheel loader is in the neutral state or is moving forward, a warning pop-up is displayed on the front monitor, and the first and second side monitors, and a pop-up screen is maintained until the warning pop-up is removed through a separate removal button.

6. The screen display method of claim 4, wherein in the operation (d), when the wheel loader is moving backward, a warning pop-up is displayed on all of the front monitor and the first and second side monitors, in such a manner that a pop-up screen automatically disappears on the first side monitor after a predetermined time, and the pop-up screen is maintained on the front monitor and the second side monitor until a separate removal button is input.

7. The screen display method of claim 4, wherein in the operation (d), when the wheel loader is performing the excavation or loading operation, a warning pop-up is displayed on the front monitor and the first and second side monitors, in such a manner that a pop-up screen automatically disappears on the second side monitor after a predetermined time, and the pop-up screen is maintained on the front monitor and the first side monitor until a separate removal button is input.

8. The screen display method of claim 1, wherein the dividing and displaying further includes operation (c) that includes displaying a screen of a weighing system on the second side monitor when the wheel loader performs an excavation or loading operation, and dividing and displaying the information, which has been displayed on the second side monitor in the operation (a), on the front monitor or the first side monitor.

9. The screen display method of claim 8, wherein the operation (c) is initiated in response to an angle sensor signal of a boom or the bucket, and when the angle sensor signal of the boom or the bucket is input, the screen of the weighing system is immediately displayed on the second side monitor, and a pop-up text notifying that the screen is changed is displayed on the front monitor and the first side monitor for a predetermined time.

10. The screen display method of claim 8, further comprising:
operation (d), that includes: when a generation of an error is detected for internal configurations of the wheel loader, displaying a warning pop-up on at least one of the front monitor and the first and second side monitors.

* * * * *